United States Patent [19]
Brender et al.

[11] Patent Number: 5,280,617
[45] Date of Patent: Jan. 18, 1994

[54] AUTOMATIC PROGRAM CODE GENERATION IN A COMPILER SYSTEM FOR AN INSTANTIATION OF A GENERIC PROGRAM STRUCTURE AND BASED ON FORMAL PARAMETERS AND CHARACTERISTICS OF ACTUAL PARAMETERS

[75] Inventors: Ronald F. Brender, Hollis; Bevin R. Brett, Merrimack, both of N.H.

[73] Assignee: Digital Equipment Corporation, Maynard, Mass.

[21] Appl. No.: 770,768

[22] Filed: Oct. 4, 1991

Related U.S. Application Data

[63] Continuation of Ser. No. 246,975, Sep. 20, 1988, abandoned.

[51] Int. Cl.5 .............................................. G06F 7/00
[52] U.S. Cl. .................................. 395/700; 364/280.4; 364/973; 364/963.5; 364/DIG. 2
[58] Field of Search ................................. 395/700, 600

[56] References Cited

U.S. PATENT DOCUMENTS

| | | | |
|---|---|---|---|
| 4,179,735 | 12/1979 | Lodi | 364/200 |
| 4,672,532 | 6/1987 | Jongevos | 364/200 |
| 4,742,467 | 5/1988 | Messerich et al. | 364/200 |
| 5,051,893 | 9/1991 | Tenny et al. | 364/200 |
| 5,062,039 | 10/1991 | Brown et al. | 364/200 |
| 5,142,681 | 8/1992 | Driscoll et al. | 395/700 |
| 5,179,703 | 1/1993 | Evans | 395/700 |
| 5,204,947 | 4/1993 | Bernstein et al. | 395/157 |

Primary Examiner—Thomas C. Lee
Assistant Examiner—Peter Y. Wang
Attorney, Agent, or Firm—Fish & Richardson

[57] ABSTRACT

A compiler maintains a library of sharable program structures generated in response to instantiations of a generic program structure, along with characteristics of parameters which were used in generating the sharable program structure. In response to an instantiation of a generic program structure, the compiler generates information relating to the characteristics and usage of each parameter which are used in connection with the instantiation. The compiler then compares that information to the corresponding information associated with the sharable program structures in the library. If the library contains a sharable program structure whose parameter information compares satisfactorily, that sharable program structure is used in connection with further operations in connection with the instantiation. On the other hand, if the library does not contain such a sharable program structure, one is generated and stored in the library, along with the characteristics of the parameters used in its generation, for use in sharing with later instantiations. In addition, the just-generated sharable program structure is used in further operations in connection with the instantiation.

8 Claims, 5 Drawing Sheets

INSTANTIATION MAP, 25

| | |
|---|---|
| FORMAL CV POINTER | —30 |
| ACTUAL CV POINTER | —31 |
| INST_DECL POINTER | —32 |
| GEN_DECL POINTER | —33 |
| BODY_DECL POINTER | —34 |
| BODY_TEMPL POINTER | —35 |
| GEN_CONTEXT POINTER | —36 |
| STUB_DECL POINTER | —37 |
| SHAR UNIT POINTER | —40 |
| INST GEN FLAG | —41 |
| TEMPL IS INCOMPLETE FLAG | —42 |
| SHAR BODY FLAG | —43 |
| IMPL INST GEN FLAG | —44 |

SHARABLE DECLARATION

INSTANTIATION MAP, 25

| | |
|---|---|
| FORMAL CV POINTER | —30 |
| ACTUAL CV POINTER | —31 |
| INST_DECL POINTER | —32 |
| GEN_DECL POINTER | —33 |
| BODY_DECL POINTER | —34 |
| BODY_TEMPL POINTER | —35 |
| GEN_CONTEXT POINTER | —36 |
| STUB_DECL POINTER | —37 |
| SHAR UNIT POINTER | —40 |
| INST GEN FLAG | —41 |
| TEMPL IS INCOMPLETE FLAG | —42 |
| SHAR BODY FLAG | —43 |
| IMPL INST GEN FLAG | —44 |

SHARABLE DECLARATION

AUTOMATIC PROGRAM CODE GENERATION IN A COMPILER SYSTEM FOR AN INSTANTIATION OF A GENERIC PROGRAM STRUCTURE AND BASED ON FORMAL PARAMETERS AND CHARACTERISTICS OF ACTUAL PARAMETERS

This is a continuation of application Ser. No. 07/246,975, filed Sep. 20, 1988, now abandoned.

BACKGROUND OF THE INVENTION

The invention relates generally to the field of digital data processing systems, and more specifically to compilers which generate machine-executable code from a high-level language.

Programs detailing the operations to be performed by a digital data processing system, or computer, are in the form of a series of instructions. In response to each instruction, the computer performs one or more operations, as defined by an operation code portion of the instruction, on data which is identified, either explicitly or implicitly, in the instruction. Originally, programmers programmed computers in what was termed "machine language". In machine language, all of the instructions are in the form of sequences of 1s and 0s, which form a binary code that the computers could interpret and use.

Because of the difficulty of programming in machine language, programmers developed forms of programming comprising, first, assembly languages and, later, higher level languages. In an assembly language, a program is also in the form of a sequence of instructions which the computer will process, but the operation code portion is in the form of a mnemonic abbreviation for the operation to occur, and the data to be processed by the instruction is typically identified by a variable name which represents the data's storage location in the computer. An assembler program processes the assembly language program to produce a machine language program which the computer can execute. Since the instructions use mnemonic abbreviations, variable names and/or storage locations, programming using assembly language was greatly simplified over machine language programming.

While assembly language programming made programming less confusing than machine language programming, it was very time-consuming since the programmer had to specify each and every operation to be performed by the computer to solve a problem. Using assembly language programming, the programmer could not limit his attention to the desired high-level arithmetic and logical operations to be performed by the computer in the processing of the algorithm, but instead had to be aware of the operations that the computer would perform in connection with each instruction.

High-level languages were developed to remedy this. High-level languages freed the programmer from having to know the details of operation of the computer, and instead allowed him to concentrate on the algorithms themselves. A compiler program processed the high-level language program to provide a machine-language program which could be executed by the computer, and as a result the compiler program effectively shielded the programmer from the computer. Indeed, programs written in high-level languages may typically be executed, after compilation, on diverse computers which typically can not be done with programs written in assembly language or machine language. A problem with programs written in a high-level language, however, is that they are often somewhat slower than programs written in assembly language which accomplish the same results, and also they can take up much more memory.

To enhance flexibility and reduce the time to actually write a program, some high-level languages permit a programmer to define certain sequences of operations or characteristics as a named generic program structure, called a generic package, generic procedure or generic function, and then use the generic structures elsewhere in the program as they are needed merely by invoking the name and identifying, as parameters, the data to be used in forming the specific structure or performing the specific operations set forth in the previously-defined generic program structure. This permits the programmer to use the program structure which has been previously defined, while at the same time avoiding repeating the program structure or sequence throughout the program. The use of a generic program structure or sequence at a specific location in a program is termed an "instantiation" of the generic program structure or sequence, since it is a specific instance of the structure or sequence, using specific types of data, and so forth.

During compilation of a program including generic program structures or sequences, two methods have been used when a generic program structure or sequence is encountered. In one method, which is the simplest to implement, a code sequence based on the previously defined generic program structure is generated at each instantiation of the generic program structure or sequence in the program which enables the performance of the operations defined in the structure or sequence on the specific forms of data that are identified in the parameters. In this method, depending on the forms of data passed by way of the parameters, the same or similar code sequences may be generated at the diverse instantiation points in the program, which may unduly expand the size of the program.

On the other hand, in another method, during compilation, a single instance of the code sequence is generated which is used at each instantiation of the generic program structure or sequence. The code sequence forming the instantiation must be sufficiently general as to be able to handle any of several types of data passed by way of the parameters which may be identified in the various instantiations. Since the code sequence must be able to handle very general situations, its generality may, in turn, adversely effect performance when the program is run.

SUMMARY OF THE INVENTION

The invention provides a new and improved system for facilitating code sharing among instantiations of a generic program structure.

In brief summary, the invention provides a new and improved compiler system which maintains a library of sharable program structures generated in response to instantiations of a generic program structure, along with characteristics of parameters which were used in generating the sharable program structure. In response to an instantiation of a generic program structure, the compiler generates information relating to the characteristics of each parameter which are used in connection with the instantiation. The compiler then compares those characteristics to the characteristics associated with the sharable program structures in the library. If the library contains a sharable program structure the characteristics of whose parameters compare satisfactorily to the characteristics of the corresponding parameters, that sharable program structure is used in connection with further operations in connection with the instantiation. On the other hand, if the library does not contain such a sharable program structure, one is generated and stored in the library, along with characteristics of the parameters used in its generation, for use in sharing with later instantiations. In addition, the just-generated sharable program structure is used in further operations in connection with the instantiation.

The new compiler system provides several benefits. By basing sharing determinations on the actual characteristics and usage of the parameters, and by generating code based on those characteristics and usages, the run-time performance of the code can be improved over code that is generated by existing compilers to handle all possible instantiations as in the past. In addition, while the degree of sharing will be less than such compilers, resulting in somewhat larger object programs, they will be smaller than object programs in which all instantiations of generic program structures are expanded inline and no sharing is used.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

FIGS. 2A through 2C depict a flow diagram illustrating the operation of the invention depicted in FIG. 1.

DETAILED DESCRIPTION OF AN ILLUSTRATIVE EMBODIMENT

A. General Description

Figure 1:
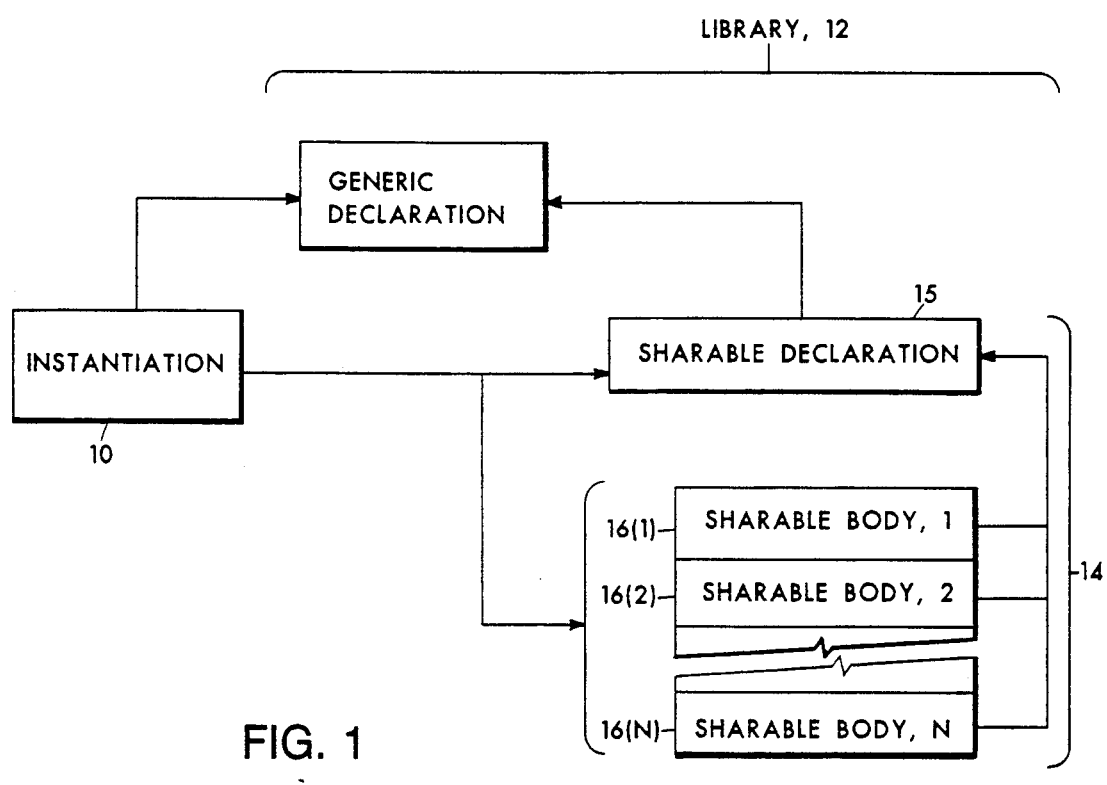
FIG. 1 is a general functional block diagram illustrating the invention.

The invention provides a new and improved system, particularly comprising a compiler, for compiling high-level languages used in programming a digital data processing system which facilitates the declaration and use of a program structure or sequence (generally identified as a "structure") as generic. The invention will be illustrated in connection with the programming language Ada. The Ada programming language accommodates three types of generic program structures, namely, generic procedures, generic functions and generic packages. Generally, procedures and functions provide program structures which define named sequences of operations, whereas packages provide program structures which allow the specification of named groups of logically related entities or objects, which are then used in the program by reference to the name. Generic procedures and functions provide generic program structures which may be instantiated in the program to provide specific sequences of operations by reference to the name of the generic procedure or function in connection with particular parameters. Similarly, generic packages provide generic program structures which may be instantiated in the program to provide a specification of a named group of logically related entities or objects by reference to the name of the generic package in connection with particular parameters.

In the Ada programming language, each generic program structure includes a generic declaration followed by a generic body. The generic declaration provides a name for the generic program structure and identifies the parameters. In the case of a generic package, the generic declaration also identifies the entities or objects which form the group identified by the package's name. The generic body of a generic program structure identifies the sequence of operations which are to be performed in connection with execution of the program structure. In the case of a generic package, entities or objects which are declared in the generic declaration may be computed in relation to a sequence of operations defined in the generic body.

In a source program in the Ada programming language, the generic declaration and generic body portions of a generic program structure may be separately set forth in a program, and, indeed, may be separately compiled, and are linked to provide an object program which may be executed by the computer. The generic declaration identifies the generic program structure as being available for use later in the program, regardless of whether the generic body has been provided. The generic body may be provided separately. When the generic body is provided, it is used in connection with generation of instantiations of the generic program structure set forth in the program.

An example of a generic program structure in the Ada programming language is the following generic procedure:

```
generic                              --+  (GENERIC    )
    type T is private;                |  (DECLARATION)
    procedure SWAP (X, Y: in out T);  --+ procedure SWAP (X, Y: in out T) is    --+
    TEMP : constant T := X;           |
begin                                 |  (GENERIC )
    X    := Y;                        |  (BODY    )
    Y    := TEMP;                     |
end;                                  --+
```

This illustrative generic program structure provides a generic program structure, named SWAP, that can be used to create instances comprising non-generic procedures which, in turn, can be used to swap the values of two variables. In this example, "T" represents a formal data type, which is also a formal parameter of the generic program structure. In creating an instance, an actual parameter, representing an actual data type, is specified when the generic program structure is used to create the instance. Formal type "T" is identified in the generic declaration as "private" to indicate that only certain operations may be performed in connection with variables of that type within the generic structure; consequently, a wide class of actual types can be used as an actual parameter in an instantiation to correspond to this formal data type.

Further, as noted above, the illustrative generic program structure can be used to create instances comprising non-generic procedures. As with procedures generally, an instantiation, as a procedure, may itself include formal parameters for which corresponding actual parameters must be provided when the procedure is called. In this case, the formal parameters for the instantiation are variables X and Y, and the instantiation is used to swap values represented by those variables using a temporary variable TEMP.

The variables representing formal parameters of an instantiation, identified in this example as variables X and Y, may be identified as input parameters, that is, parameters whose values are provided by the containing program, by use of the designation "in". In addition, variables representing formal parameters of an instantiation may be identified as output parameters, that is, parameters whose values are used by the containing program, by use of the designation "out". A variable whose value is both provided by the containing program and used by the containing program is identified by the designation "in out".

As is evident from the above example, a generic program structure includes a declaration portion which identifies the structure as generic and identifies the parameters, and a body portion which defines a sequence operations in connection with the parameters, which are of the formal private type T. The generic program structure can be thereafter instantiated in the program for use in connection with fixed point or integer data by the following:

procedure SWAP_INT is new SWAP(INTEGER);

which creates, as an instance, a procedure named SWAP_INT which can swap integer data, that is, data having a data type named INTEGER.

Similarly, the generic program structure can be instantiated in the program for use in connection with floating point data by the following:

procedure SWAP_FLOAT is new
SWAP(FLOAT);

which creates, as an instance, a procedure named SWAP_FLOAT which can swap floating point data, that is, data having a data type named FLOAT. The generic program structure thus is instantiated by identifying the generic program structure by its name, which in this case is SWAP. In addition, parameters may be specified in the instantiation which are specific to the instantiation. In creating an instantiation of the generic program structure, the compiler generates code which enables the operations defined by the generic program structure to be performed on the values identified by the input parameters and which provides as output values in response thereto which may be used in the portion of the program following the instantiation.

More specifically, with reference to FIG. 1, in response to an instantiation 10 of a previously-defined generic program structure, the compiler performs syntactic analysis in connection with the instantiation, to verify that the instantiation is correctly specified syntactically, and semantic analysis to verify that the instantiation is correctly specified semantically. In performing syntactic analysis, the compiler attempts to recognize both the individual words and the sequence of words used in the instantiation to verify, among other things, that the words define operations which it recognizes. In performing semantic analysis, the compiler performs a number of checks, including the verification that the actual parameters defined in the instantiation are consistent with the formal parameters defined in the generic declaration portion of the generic program structure.

The compiler maintains a compilation library 12 in which it stores, among other information used during the compilation, for each generic program structure, sharable units of compiled program code which may be shared among instantiations. Each sharable unit includes, for each formal parameter in the generic program structure, a representative actual parameter which contains information as to the properties of the associated formal parameter which were used in connection with generating the compiled program code for the sharable unit.

More specifically, associated with each generic program structure in the compilation library 12 is one or more records 14 associated with the generic program structure. Each record 14 comprises a sharable unit comprising a sharable declaration 15, which is associated with the structure's generic declaration. In addition, each record 14 may include one or more sharable units comprising sharable bodies 16(1) through 16(N) (generally identified by reference numeral 16) associated with the generic program structure's generic body. As noted above, the sharable body portion of the generic program structure may be provided separately, and until it is provided the record 14 will not contain any sharable bodies 16.

Each sharable declaration 15 is associated with compiled program code relating to the generic declaration portion of the generic program structure compiled in connection with representative actual parameters which detail characteristics of the parameters that were used in generating the compiled program code. In the case of the declaration portion of a generic procedure or generic function, the compiled program code associated with a sharable declaration 15 may, for example, comprise code which indicates the instantiation of the generic procedure or generic function at the location in the program. In the case of the declaration portion of a generic package, the compiled program code may comprise code used to specify a named group of logically related entities or objects at the location in the program.

Similarly, each sharable body 16 is associated with compiled program code enabling the performance of the operations defined by the generic body compiled in connection with a set of representative actual parameters, which also detail characteristics of the parameters that were used in generating the compiled program code associated with the sharable body 16.

A generic program structure may be associated with one or more records 14. A generic program structure may be associated with multiple records 14 if the various instantiations of the generic program structure require creation of multiple sharable declarations 15. As noted above, each sharable declaration 15 and sharable body 16 includes, for each formal parameter in the generic program structure, a representative actual parameter which includes such information as the characteristics used in connection with its compilation. Thus, a sharable declaration 15 or sharable body 16 generated for one instantiation may be used for a second instantiation if the characteristics of the actual parameters of the second instantiation correspond to the characteristics which were used in generating the sharable declaration 15 or sharable body 16, respectively, which were recorded in the representative actual parameters of the sharable declaration 15 and sharable body 16.

Otherwise stated, the characteristics of the representative actual parameters which are used in compiling a sharable declaration 15 in response to an instantiation provide a limitation on the use of the sharable declaration 15 in connection with other instantiations. In addition, the characteristics of the representative actual parameters which are used in compiling a sharable body 16 in response to an instantiation of a generic program structure provide a limitation on the sharing of a sharable body 16 in connection with other instantiations of the generic program structure.

During a compilation, when the compiler compiles an instantiation of a generic program structure, it searches the records 14, if any exist, which were previously created during compilation of the various instantiations of the generic program structure. The compiler first attempts to locate a record 14 which contains a sharable declaration 15 which it can use in connection with the instantiation. The compiler bases its selection of a record 14 on the characteristics of the instantiation's actual parameters and those recorded in the representative actual parameters of the sharable declaration 15 in the record.

On the other hand, if the compiler determines, based on the characteristics of the actual parameters of the particular instantiation being compiled, and the characteristics recorded in the representative actual parameters of the sharable declaration in the records 14, that no records 14 contain sharable declarations that may be used for the instantiation, it creates a new record 14, including a new sharable declaration 15, and links it in the library 12. The sharable declaration 15 includes representative actual parameters that identify characteristics that were used in compiling the sharable declaration 15. The new sharable declaration is available for that instantiation, and also for sharing with subsequent instantiations of the generic program structure.

If the compiler locates a record 14 which contains a sharable declaration 15 which it can use in connection with compiling an instantiation 10, and if the record contains sharable bodies 16, it attempts to locate a sharable body which it can use in connection with the instantiation. In doing this, it compares the characteristics of the instantiation's actual parameters with the characteristics recorded in the representative actual parameters of each of the sharable bodies 16. If the record 14 contains a sharable body 16 whose representative actual parameters contain characteristics that compare satisfactorily with the characteristics of the actual parameters associated with the instantiation 10, the compiler uses that sharable body 16 in connection with compilation of the instantiation 10.

On the other hand, if the compiler determines, based on the characteristics of the actual parameters of the particular instantiation being compiled, and the characteristics recorded in the representative actual parameters of the sharable bodies 16 in the record 14, that none of the sharable bodies 16 in the record 14 may be used for the instantiation, it compiles a new sharable body 16 and links it to the sharable declaration 15, including representative actual parameters, each identifying the characteristics of the corresponding actual parameter that were used in compiling the sharable body 16. The new sharable body 16 is thus available for that instantiation, and also for sharing with subsequent instantiations of the generic program structure.

It will be appreciated that, when the first instantiation of a generic program structure is compiled, no records 14 will be present in the compilation library 12. Accordingly, the compiler will be required to generate, for the first instantiation, a record 14 including a sharable declaration, and, if the generic program structure includes a body, a sharable body, and provide the identification of the record 14 to the library 12.

A number of characteristics may be references in connection with the actual parameters of an instantiation 10 and the representative actual parameters of a sharable declaration 15 or sharable body 16 in determining whether a sharable declaration 15 or sharable body 16 may be used for the instantiation 10. The detail of the characteristics may vary from very specific to somewhat general. If the characteristics are specific, sharable declarations 15 and sharable bodies 16 are less likely to be shared, but the compiled program code for the sharable declaration 15 and sharable body 16 need not be general so as to handle the general characteristics. On the other hand, if the characteristics selected are of more general applicability, sharable declarations 15 and sharable bodies 16 are more likely to be shared but the compiled program code therefor will be general enough to handle the more general characteristics. Illustrative characteristics include, for example, whether the data represented by the representative actual parameters are fixed or floating, that is, whether the data are of type INTEGER or FLOAT, whether the data are byte, word, longword, single or double precision, whether the data are aligned by bit, byte or other boundaries, whether the data are arithmetic, string data, numerical ranges and so forth.

The new compiler thus enhances sharing of declarations and bodies by basing sharing decisions on characteristics of the actual parameters associated with an instantiation and the declarations and code that are actually used during compilation of an instantiation, which are reflected in the characteristics recorded in the representative actual parameters in the sharable declarations 15 and sharable bodies 16. In prior arrangements which allowed sharing, only formal parameters were used in determining whether sharing was permitted. Thus, compilation of an instantiation required either that all possible characteristics of the actual parameters be taken into account in generating the code, or that sharing be restricted. Alternatively, the compiler generated code for each instantiation, which eliminated problems relating to generality of the compiled code, but effectively precluding sharing and unduly increased the amount of code generated.

Specific Discussion

With this background, the detailed structure of the new compiler will be described in connection with FIGS. 2A, 3 and 4.

Preliminarily, as is conventional, the general functions of the new compiler are divided into a front end whose operations depend upon the language of the source program, and a back end whose operations depend upon the program code which is recognizable by the particular computer which is to execute the program. The front end performs lexical and syntactic analysis on the source program to identify the sequential high-level language instructions and determine that each is correctly stated within the context of the rules of the high-level language, static semantic analysis which, in part, verifies whether the sequences of instructions are properly stated, and generates an intermediate code. The back end, from the intermediate code, generates an object code program which includes instructions recognizable by the computer which is to execute the program. Typically, source programs are written in modules which may be separately compiled, and linked by a linker (which is typically not part of the compiler) to form a complete program which may be executed by the computer.

With this background, the front end, during its semantic analysis phase, identifies sequences of one or more source program instructions which it processes as a unit. In particular, the front end iteratively processes the source program instruction sequences to determine whether they form or contain a generic program structure or element thereof, such as a generic declaration or generic body (step 100, FIG. 2A). If so, it links the generic program structure in the library 12 (step 101, FIG. 2A). On the other hand, if the front end determines, in step 100 that a source program instruction sequence does not form or contain a generic program structure, it sequences to step 102. In step 102, the front end determines whether the source program instruction sequence forms an instantiation of a generic program structure. If not, it sequences to step 103 and proceeds to compile the source program instruction sequence using conventional compilation techniques.

If, however, the front end determines in step 102 that the source program instruction sequence forms or contains an instantiation, it sequences to step 104, in which it generates an instantiation specification and an instance generator and links them into the compilation library 12 (step 104). The instantiation specification identifies the generic program structure being instantiated and the parameters, and the instance generator includes an instantiation map 25 (FIG. 3). Using the above generic program structure SWAP and the instantiation SWAP_INT as an example, the front end expands the instantiation

```
    procedure SWAP_INT is new SWAP(INTEGER);
to:
    procedure SWAP_INT is new SWAP(INTEGER);                    [1]
    procedure SWAP_INT (X, Y: in out INTEGER);        ------+
        <where the formal parameters for SWAP_INT                [2]
        result from copy substitution from the                    |
        generic declaration, replacing generic                    |
        formal type T with actual type INTEGER>       ------+
    procedure SWAP_INT (X, Y: in out INTEGER) is      ------+
        <instantiation map>                                      [3]
end;                                                  ------+
```

The compiler then modifies the procedure body [3] to:

```
procedure SWAP_INT (X, Y: in out INTEGER) is
    separate;                                                    [4]
``` which indicates that the operations performed in response to the procedure call are separately provided, in this case an instance generator unit, and creating the instance generator as follows:

```
separate (PROC)                                                  [5]

procedure SWAP_INT (X, Y: in out INTEGER) is       --+
    <instantiation map>                                          [6]
                                                   --+
```

Upon creation of [1] through [4], they are linked in the compilation library 12 as a parent structure of the instance generator, with the instance generator comprising [5] and [6].

The instantiation map 25 contains fields for much of the information which is used in completing compilation of the instance generator 20. Not all of the fields receive information when the instance generator 20 is generated; some of the information in the fields is provided later during completion of the instance generator 20.

Figures 3, 4:
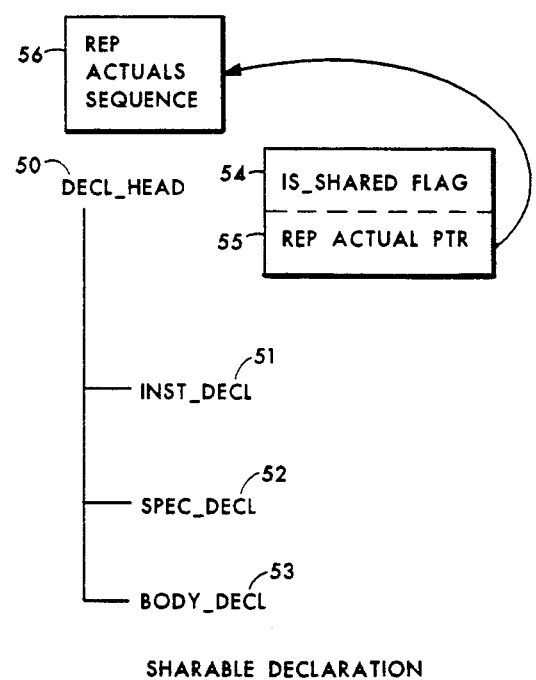
FIGS. 3 and 4 depict diagrams of data structures useful in understanding the invention depicted in FIG. 1 and the operations depicted in FIGS. 2A through 2C.
Figures 3, 4:
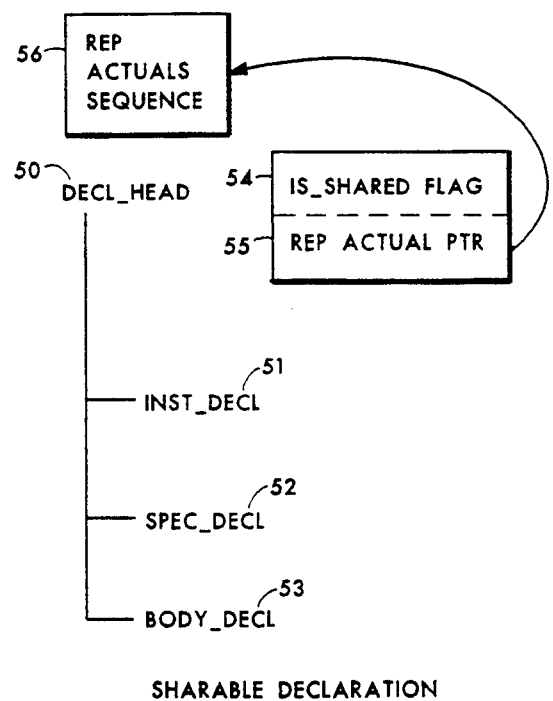

The general structure of an instantiation map 25 is depicted in FIG. 3. With reference to FIG. 3, the instantiation map 25 includes a number of fields for pointers to the formal and actual parameters, the generic declaration and body, which is also linked in the compilation library 12, and the record 14 associated with the generic program structure and sharable declaration 15 and sharable body 16 which has been selected to be used in connection with compilation of the instantiation.

The instantiation map includes two fields related to the parameters of the generic program structure and the instantiation Specifically, a FORMAL_CV field 30 contains a pointer to a formals counted vector. The formals counted vector, in turn, includes a first entry whose contents indicate the number of additional entries in the vector, with each of the additional entries comprising a pointer to a formal parameter in the generic program structure. An ACTUAL_CV field 31 contains a pointer to an actuals counted vector, which in turn includes a first entry whose contents indicate the number of additional entries in the vector, with each of the additional entries containing a pointer to an actual parameter. Each of the sequential entries in the counted vector pointed to by the contents of the ACTUAL_CV field 31 corresponds to the sequential entry in the counted vector pointed to by the contents of the FORMAL_CV field 30.

The instantiation map 25 also includes a number of other pointer fields which point to the various portions of the instance generator with which the instantiation map 25 is associated. The contents of a INST_DECL_POINTER instantiation declaration pointer field 32 points to an instantiation declaration associated with the instantiation map 25. The contents of a BODY_DECL_POINTER body declaration pointer 34 points to a specification declaration associated with the instantiation map 25. Similarly, the contents of a BODY_TEMPL_POINTER body template pointer field 35 points to a body declaration.

The instantiation map 25 also includes several pointer fields to the generic program structure related to the instantiation and to context information. The contents of a GEN_DECL_POINTER generic declaration pointer field 33 points to the generic declaration portion of the generic program structure. As described above, the generic program structure may be declared and used elsewhere in a program without initially providing the body or details of operations. If this occurs, the contents of a STUB_DECL field 37 provides a location into which a pointer to a compilation unit for the body or details of operations may be inserted. If the generic program structure associated with the instantiation map 25 is contained in another generic declaration or generic body, the contents of a GEN_CONTEXT_POINTER generic context pointer field point to the containing generic declaration or generic body to facilitate nesting of generic program structures.

The last pointer in the instantiation map 25 is a SHAR_UNIT_POINTER sharable unit pointer field 40 into which the compiler loads a pointer identifying the location of a sharable declaration 15 or sharable body 16. The SHAR_UNIT_POINTER sharable unit pointer field 40 may point to a sharable unit which has previously been generated, or it may point to a sharable unit which is being generated in response to the instance generator and which may be later used in connection with other instance generators.

As noted above, the instantiation map 25 includes several flags, including an INST_GEN instantiation generator flag 41, a TEMPL_IS_INCOMPL body is incomplete flag 42, a SHAR_BODY sharable body flag 43 and an IMP_INST_GEN implicit instance generator flag 44. The conditions of the INST_GEN instantiation generator flag 41 and SHAR_BODY sharable body flag 43 indicate whether the instantiation map 25 is part of an instance generator. As described above, the generic program structure may be declared without initially providing a generic body, and the condition of the TEMPL_IS_INCOMPL template is incomplete flag 42 is used during compilation to indicate whether the generic body has been provided. Finally, if the instantiation relates to a library package, procedure or function provided by the language, there is no explicit generic program structure defined in the program. The condition of the IMP_INST_GEN implicit instance generator flag 44 indicates whether the program explicitly defines the generic program structure, or whether the instance generator relates to a library package, procedure or function.

Following step 104, the front end identifies actual parameters associated with the instantiation (step 105), which are recorded by the ACTUALS_CV actuals counted vector in the instantiation map 25 associated with the instantiation, and passes the instance generator, including the instantiation map to the back end. Upon receiving the instance generator, the back end proceeds to determine if the compilation library 12 contains any sharable declarations 15 that can be used for the instantiation (step 106, FIG. 2A). In this operation, the back end obtains from the compilation library 12 the identification of records 14 associated with the generic program structure being instantiated, and searches through their sharable declarations 15 to identify one which can be used in connection with the instantiation.

The back end identifies a sharable declaration 15 which may be used in connection with compilation of the instantiation (step 106) by comparing characteristics of the representative actual parameters which were used in generating the sharable declaration with the characteristics of the actual parameters in the declaration of the instantiation which were supplied by the back end. The back end returns to the front end either the identification of a sharable declaration the characteristics of whose representative actual parameters match the characteristics of the actual parameters of the instantiation, or alternatively an indication that no such sharable declaration 15 exists (step 107).

The subsequent operations of the front end are determined by whether or not the back end returns the identification of a sharable declaration 15 which is to be used in connection with the compilation of the instantiation. If the back end does not, in step 107, return the identification of a sharable declaration 15, the front end proceeds with the creation of a sharable declaration 15 (step 110, FIG. 2B) using the generic declaration, the instance generator, and the actual parameters of the instantiation. As part of this process, the front end creates representative actual parameters and includes them as part of the sharable unit. At this point in the compilation, the representative actual parameters reflect only the properties of the generic formal parameters associated with the generic declaration, except that each also contains a pointer to the corresponding actual parameter associated with the instantiation.

The front end then suspends compilation of the source program instruction sequence that contains the instantiation and passes the newly created sharable unit to the back end to complete processing and code generation for the sharable unit. During processing by the back end, the back end updates the representative actual parameters to reflect characteristics of the actual parameters that it found to be needed and which it used during generation of the object code. When the back end is finished, it eliminates, from the representative actual parameters, the pointers to the actual parameters of the instantiation, so that the sharable unit becomes independent of the instantiation. The back end then links the sharable unit in the compilation library 12 in a new record associated with the generic program structure (step 111), completing the creation of the sharable unit. The front end then resumes processing of the source program instruction sequence that includes the instantiation.

The newly-created sharable declaration 15 is then identified as the sharable declaration to be used in connection with the compilation of the instantiation by inserting a pointer to it in the SHAR_UNIT_POINTER sharable unit pointer field 40 of the instantiation map 25 of the instance generator associated with the instantiation.

The structure of a sharable declaration 15 is depicted in FIG. 4. It will be appreciated that the structure of a sharable declaration 15 is similar to the structure of an instantiation. The sharable declaration includes a DECL_HEAD declaration head node 50 which points to an INST_DECL instantiation declaration node 51, an SPEC_DECL specification declaration node 52 and a BODY_DECL body declaration node 53. The INST_DECL instantiation declaration node 51 points to the instance generator which resulted in creation of the sharable declaration 15. Similarly, the SPEC_DECL specification declaration node 52 and BODY_DECL body declaration node 53 point to the generic specification and generic body in the generic program structure. The BODY_DECL body declaration node 53 also points to the various sharable bodies 16 created in response to the generic body of the generic program structure when it is provided. As noted above, the generic body may be provided separately of the generic declaration.

The DECL_HEAD declaration head node 50 also includes an IS_SHARED flag 54 which is conditioned to indicate that the sharable declaration 15 can be shared. In addition, the node 50 also includes a pointer 55 to a buffer 56 which contains the representative actual parameters which were used in connection with creation of the sharable declaration 15. The order of the sequence of representative actual parameters in buffer 56 is the same as the order of the formal parameters in the declaration of the generic program structure. While the back-end is generating the object code, it accumulates, in the buffer 56, the information identifying the characteristics of the representative actual parameters which it used in the code generation. In particular, if a formal parameter is a formal type, the representative actual parameter may include such information as the data representation, the alignment and the size. The alignment information indicates whether the parameter is to be aligned on a bit, byte or word boundary. The size information may indicate, for example, whether the parameter represents a single element or value, or an array of values, and the number of bytes required to represent each value.

With particular respect to the Ada programming language, if the formal parameter is a formal type, each representative actual parameter also includes information specific to the data type of the parameter, as indicated by the formal parameters. If the data type is DISCRETE, the representative actual parameter includes such information as whether the parameter is represented as an arithmetic progression, and, if so, identifies how the first element is represented and the spacing between values of the elements of the progression. In addition, the representative actual parameter identifies the number of bytes required to represent each element of the progression.

If the data type is FIXED POINT, the representative actual parameter identifies the smallest value and a delta value. If the data type is PRIVATE, the representative actual parameter provides such information as how an object of the type is to be initialized, how objects are to be compared for equality, constraints, and whether the actual is a composite type or an array type.

If the formal parameter is a formal object, the representative actual parameter may also include such information as the location of the actual parameter, whether the object is stored in biased, or otherwise encoded form, and constraints on the formal object.

It will be appreciated that the number of types of usage information that is selected governs the degree of sharing which can be accomplished. Each type of usage information which is provided reflects a factor that is used in code required for the instantiation. Accordingly, if a large number of types of usage information is provided for each representative actual parameter, the degree of sharing may be reduced, although, since the code will be more specific to the instantiation, performance may be enhanced. On the other hand, if the number of types of usage information is reduced, which would permit broader sharing, the performance of the code generated may be adversely effected.

Figure 2A:
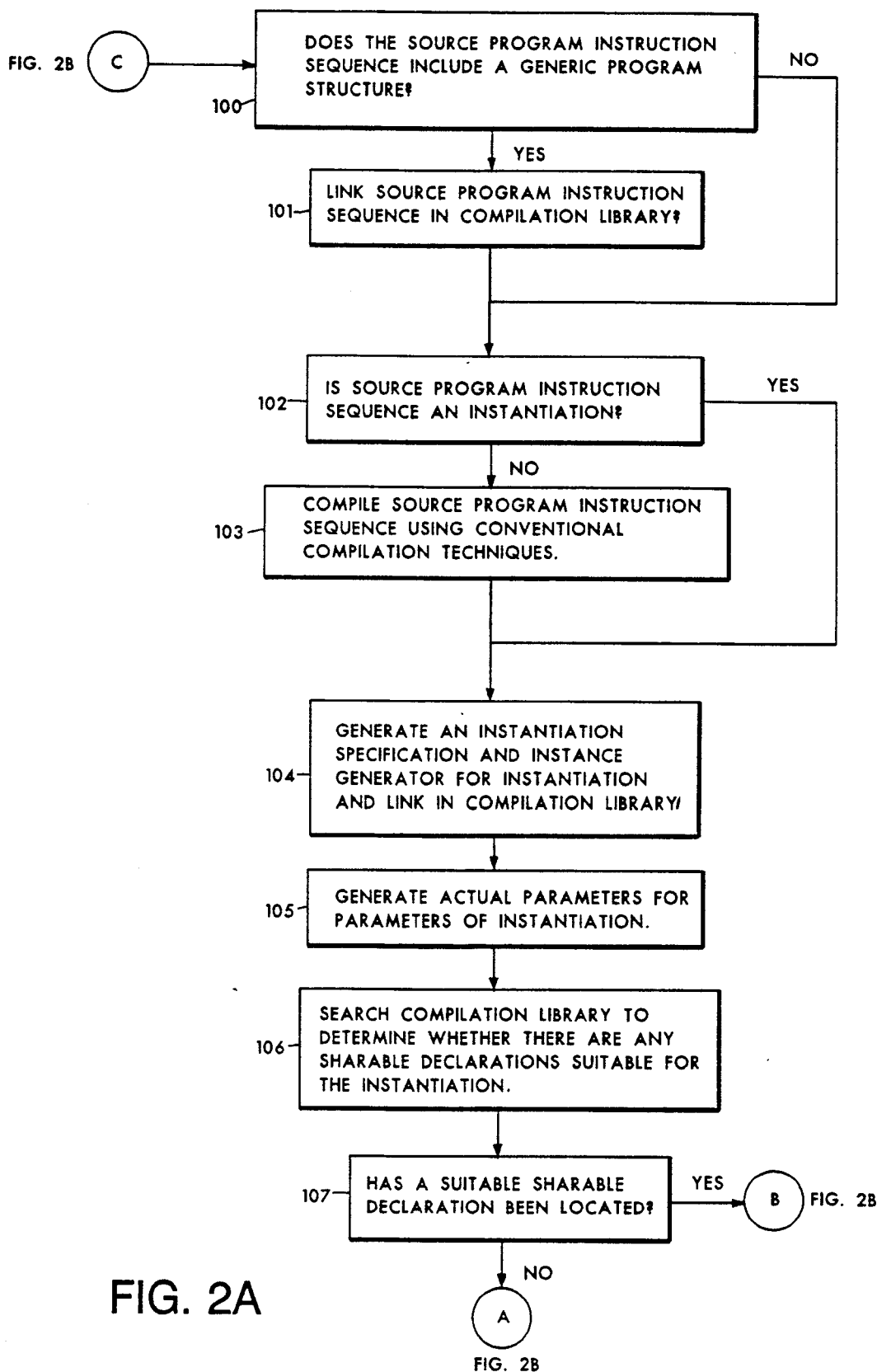

Returning to step 107 (FIG. 2A), if the back end has located a suitable sharable declaration for the instantiation, or following step 111 (FIG. 2B), the front end generates code in the intermediate language to be used at the site of the instantiation in the generated code sequence (step 112, FIG. 2B). The front end then performs a merge operation in which it merges information from the sharable declaration 15 into the intermediate language code at the instantiation site (step 113). Thereafter, it performs an allocation operation for an activation record to allocate run-time space for the instantiation (step 114). Since the size of the activation record may not be determined until link time, a link-time symbol is used to allocate the activation record, which may be replaced by the linker in a conventional manner with code to allocate the run-time space for the instantiation.

After generation or location of an appropriate sharable declaration 15, the front end determines whether the generic body for the generic program structure has been provided or modified since the last compilation. If the generic body has not been provided or modified, the front end returns to step 100 (FIG. 2A) to process the next source program code sequence. On the other hand, if the generic body has been provided, the front end proceeds to complete the instance generator for the instantiation (step 114), by completing the instantiation map associated with the instantiation.

Figure 2C:
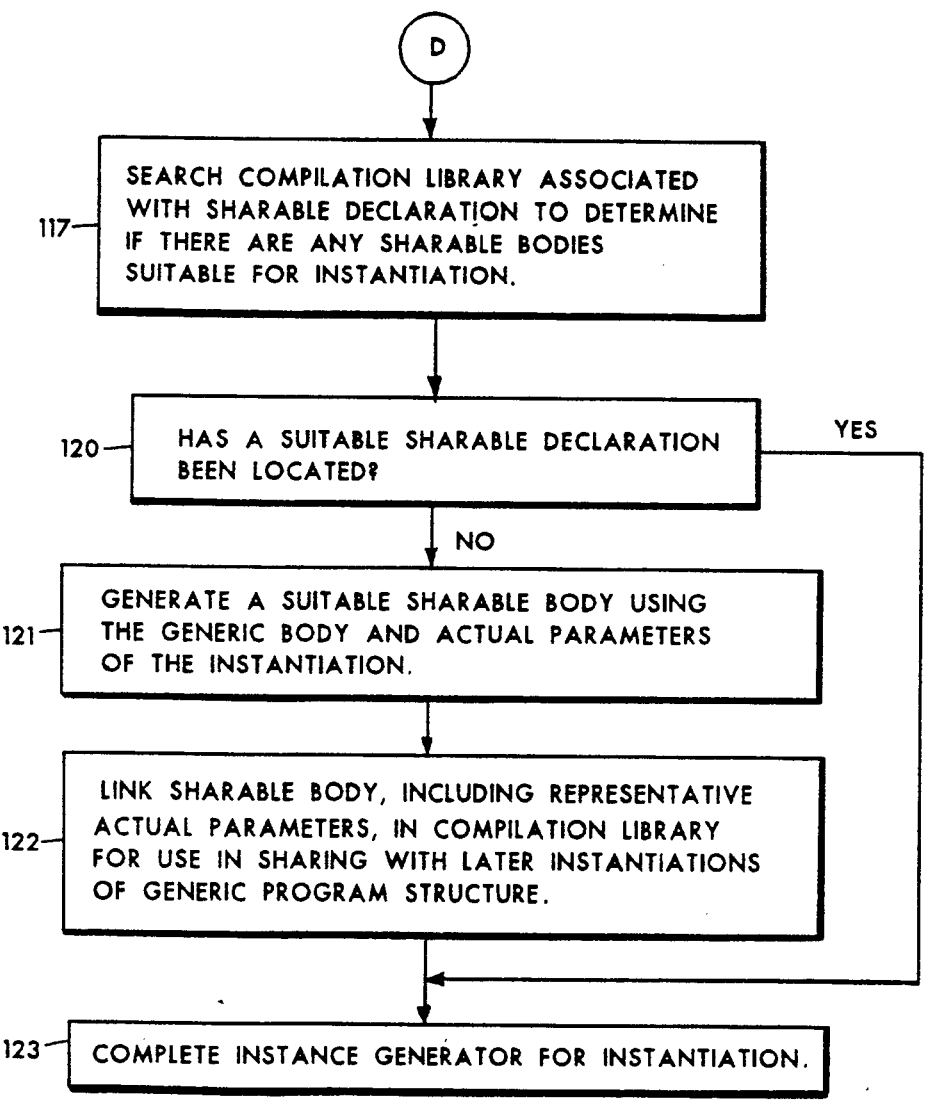

In completing the instance generator, the front end first initiates location or generation of a sharable body 16 in the record 14 associated with the sharable declaration 15 selected for the sharable declaration of the generic program structure for use in connection with the instantiation. The sharable body 16 has a structure similar to that shown in FIG. 4 in connection with a sharable declaration 15, including the representative actual parameters and associated characteristics identifying the usage information used in generating the sharable body 16. The operations performed in connection with location or creation of the sharable body 16 (namely, steps 117 and 120 through 122, FIG. 2C) are similar to those described above in connection with location or creation of the sharable declaration 15.

After the sharable body 16 has been located or created (steps 117 and 120 through 122, FIG. 2C), the front end proceeds to complete the instance generator associated with the instantiation (step 123). An incomplete instance generator is identified by the TEMPL_IS_INCOMPL body is incomplete flag having the appropriate condition. As described above, the instantiation pointers associated with the generic body identify the various instantiations associated therewith. When a generic body for a generic program structure is provided, each instance generator pointed to is completed in order. The address of the activation record in the compilation library 12 is then determined. The result is then passed to the back-end for code generation of the instantiation in a conventional manner using the pointers in the instantiation map 25.

As noted above, the generic body may later be modified. If that occurs, the completed instance generator may be modified to reflect the modifications to the generic body.

After the front end and back end have completed processing of each instantiation, they proceed to process the next instantiation, until all instantiations of generic program structures have been processed.

As described above, a number of characteristics of the representative actual parameters can be used in determining whether a previously-generated sharable declaration 15 or sharable body 16 can be used in connection with a particular instantiation. The degree of detail serves to determine the degree of sharing which can be accommodated. In addition, in determining whether characteristics of the representative actual parameters of a sharable declaration 15 would permit sharing, various matching rules may be used. For example, the characteristics of the instantiation's actual parameters and sharable declaration's representative actual parameters may be required to be the same if the representative actual parameters are a variable or a constant. Alternatively, if a representative actual parameter is an array, a matching rule may require the size of the instantiation's array to correspond to the size of the sharable declaration's array. It will be appreciated that other matching rules may also be used.

It will be appreciated that the new compiler provides several benefits. For example, by basing determinations of whether a declaration or body can be shared in an instantiation on the actual characteristics and usage of the parameters, and by generating code for the declaration and body based on those characteristics and usages, the run-time performance of the code can be improved over code generated by prior compilers to handle all possible instantiations as in the past. In addition, while the degree of sharing will be less than such prior compilers, resulting in somewhat larger object programs, they will be smaller than object programs in which all instantiations of generic program structures are expanded inline and no sharing is used.

The foregoing description has been limited to a specific embodiment of this invention. It will be apparent, however, that variations and modifications may be made to the invention, with the attainment of some or all of the advantages of the invention. Therefore, it is the object of the appended claims to cover all such variations and modifications as come within the true spirit and scope of the invention.

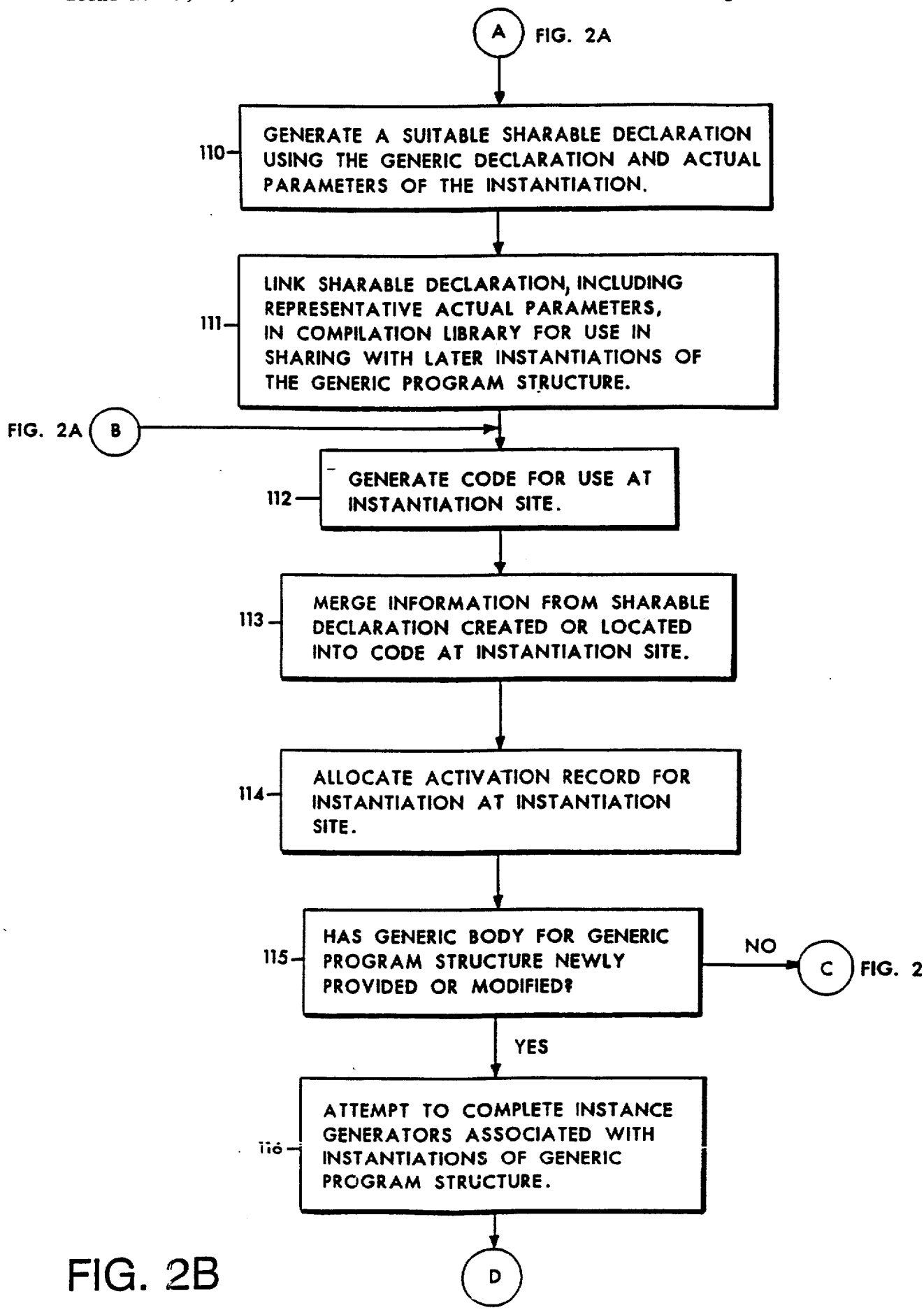

What is claimed as new and desired to be secured by Letters Patent of the United States is:

1. A compiler for use in compiling an instantiation of a generic program structure having formal parameters, a generic declaration and an associated generic body, said compiler comprising:

A. a sharable program structure store for storing a sharable program structure wherein said sharable program structure corresponding to said generic declaration includes a sharable declaration and one or more sharable bodies associated therewith, wherein each of said one or more sharable bodies includes one or more representative actual parameters each of which corresponds to a different formal parameter of said generic program structure and has one or more characteristics, wherein the representative actual parameters for each of said one or more sharable bodies have different characteristics from the characteristics of the representative actual parameters for the other of said one or more sharable bodies;

B. an instantiation processor comprising:
   i. an actual parameter generator for generating an actual parameter for each formal parameter of the generic program structure;
   ii. a characteristic generator for generating one or more characteristics for each actual parameter generated by said actual parameter generator;
   iii. a sharable body selector for selecting from said sharable program structure store a sharable body that has representative actual parameters each of which has characteristics comparable to characteristics of a corresponding actual parameter of the instantiation; and
   iv. a code generator for generating code for the instantiation, wherein the code which is generated for the instantiation includes a call to said sharable body selected by said sharable body selector.

2. A compiler as defined in claim 1 wherein said sharable program structure includes more than one sharable body associated therewith.

3. A compiler as defined in claim 1 wherein each of said one or more characteristics of a representative actual parameter identifies a corresponding usage of that characteristic of that representative actual parameter by the generic body.

4. A compiler as defined in claim 3 further comprising a sharable body generator for generating a sharable body for storage in said sharable program structure store;
   wherein said sharable body generator generates a sharable body in response to said sharable body selector determining that the sharable program structure store does not contain a sharable body that has representative actual parameters each of which has characteristics which compare with characteristics of a corresponding actual parameter of the instantiation.

5. A compiler as defined in claim 3 wherein said sharable declaration includes one or more representative actual parameters, each of which has one or more characteristics, and further comprising
   a sharable declaration generator for generating a sharable declaration for storage in said sharable program structure store; and
   a sharable declaration selector for selecting from said sharable program structure store a sharable declaration that has representative actual parameters each of which has characteristics which compare with characteristics of a corresponding actual parameter of the instantiation;
   wherein said sharable declaration generator generates said sharable declaration in response to said sharable declaration selector determining that the sharable program structure store does not contain a sharable declaration that has representative actual parameters each of which has characteristics which compare with characteristics of a corresponding actual parameter of the instantiation.

6. A compiler as defined in claim 3 further comprising
(A) a sharable program structure generator comprising:
   (i) a sharable body generator for generating a sharable body for storage in said sharable program structure store;
   (ii) a sharable declaration generator for generating a sharable declaration for storage in said sharable program structure store; and
(B) a sharable program selector comprising:
   (i) said sharable body selector;
   (ii) a sharable declaration selector for selecting from said sharable program structure store a sharable declaration that has representative actual parameters each of which has characteristics which compare with characteristics of a corresponding actual parameter of the instantiation;
wherein said sharable declaration generator generates said sharable declaration in response to said sharable declaration selector determining that the sharable program structure store does not contain a sharable declaration that has representative actual parameters each of which has characteristics which compare with characteristics of a corresponding actual parameter of the instantiation.

7. A method of processing instantiations of a generic program structure in compiling a source language program comprising the steps, for each instantiation, of:
A. determining whether a sharable program structure associated with the generic program structure exists for use with the instantiation by comparing characteristics of actual parameters of the instantiation with characteristics of representative actual parameters of previously-generated sharable program structures;
B. upon determining that a sharable program structure exists, generating a call to said sharable program structure in subsequent compilation of the instantiation; and
C. upon determining that a sharable program structure does not exist, generating a sharable program structure, including representative actual parameters that include information identifying characteristics of their usage in generating the sharable program structure, and making the newly generated sharable program structure available to be called by current and subsequently-processed instantiations.

8. The method as defined in claim 7 wherein a sharable program structure includes a sharable declaration and one or more sharable bodies associated therewith, and wherein the steps of determining, using and generating further comprise:
A. determining whether a sharable declaration associated with the generic declaration exists for use with the instantiation by comparing characteristics of actual parameters of the instantiation with characteristics of representative actual parameters of previously-generated sharable declarations;
B. upon determining that a sharable declaration exists, using said sharable body in subsequent compilation of the instantiation; and
C. upon determining that a sharable declaration does not exist, generating a sharable declaration, including representative actual parameters, for use with the instantiation, the representative actual parameters including information identifying characteristics of their usage in generating the sharable declaration, and making the newly generated sharable declaration available to be called by current and subsequently-processed instantiations;
D. determining whether a sharable body associated with the generic body exists for use with the instantiation by comparing characteristics of actual parameters of the instantiation with characteristics of representative actual parameters of previously-generated sharable bodies;
E. upon determining that a sharable body exists, using said sharable body in subsequent compilation of the instantiation;
F. upon determining that a sharable body does not exist, generating a sharable body, including representative actual parameters, for use with the instantiation, the representative actual parameters including information identifying characteristics of their usage in generating the sharable body, and making the newly generated sharable body available to be called by current and subsequently-processed instantiations.

* * * * *

UNITED STATES PATENT AND TRADEMARK OFFICE
CERTIFICATE OF CORRECTION

PATENT NO. : 5,280,617

DATED : January 18, 1994

INVENTOR(S) : Ronald F. Brender; Bevin R. Brett

It is certified that error appears in the above-indentified patent and that said Letters Patent is hereby corrected as shown below:

Delete Sheet 5 of the drawings/figures, as it is the same as Sheet 4.

Add the attached FIG. 2B as a new sheet of drawings/figures after Sheet 2.

Signed and Sealed this

Twenty-third Day of May, 1995

Attest:

BRUCE LEHMAN

Attesting Officer

Commissioner of Patents and Trademarks